(12) United States Patent
Shinada et al.

(10) Patent No.: US 9,173,172 B2
(45) Date of Patent: Oct. 27, 2015

(54) COMMUNICATION CONTROL APPARATUS AND COMMUNICATION CONTROL METHOD

(71) Applicant: FUJITSU LIMITED, Kawasaki-shi, Kanagawa (JP)

(72) Inventors: Yuki Shinada, Saitama (JP); Daisuke Nitta, Kawasaki (JP); Yutaka Hamada, Yokosuka (JP); Takahiro Kawaguchi, Kamakura (JP); Hiromitsu Kawai, Yokohama (JP); Masanori Hashimoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 13/946,039

(22) Filed: Jul. 19, 2013

(65) Prior Publication Data
US 2014/0045479 A1 Feb. 13, 2014

(30) Foreign Application Priority Data
Aug. 7, 2012 (JP) .................................. 2012-175175

(51) Int. Cl.
| | |
|---|---|
| *H04W 36/00* | (2009.01) |
| *H04W 52/04* | (2009.01) |
| *H04W 72/04* | (2009.01) |
| *B66B 1/34* | (2006.01) |
| *H04W 52/28* | (2009.01) |
| *H04W 64/00* | (2009.01) |
| *H04W 52/14* | (2009.01) |
| *H04W 52/24* | (2009.01) |

(52) U.S. Cl.
CPC ............. *H04W 52/04* (2013.01); *B66B 1/3461* (2013.01); *H04W 52/283* (2013.01); *H04W 72/04* (2013.01); *H04Q 7/22* (2013.01); *H04W 52/143* (2013.01); *H04W 52/243* (2013.01); *H04W 64/00* (2013.01)

(58) Field of Classification Search
CPC ....................................................... H04Q 7/22
USPC .................................................... 455/436–443
See application file for complete search history.

(56) References Cited

U.S. PATENT DOCUMENTS

| | | | | |
|---|---|---|---|---|
| 7,450,943 | B2 * | 11/2008 | Black et al. ................... | 455/436 |
| 2008/0194261 | A1 * | 8/2008 | Voyer et al. ................... | 455/436 |
| 2008/0200172 | A1 * | 8/2008 | Voyer et al. ................... | 455/436 |
| 2011/0130144 | A1 * | 6/2011 | Schein et al. ................. | 455/442 |
| 2012/0264436 | A1 | 10/2012 | Fujito | |

FOREIGN PATENT DOCUMENTS

| | | |
|---|---|---|
| JP | 2011-120095 A | 6/2011 |
| JP | 2011-135383 A | 7/2011 |

* cited by examiner

*Primary Examiner* — Nathan Mitchell
*Assistant Examiner* — Majid Syed
(74) *Attorney, Agent, or Firm* — Arent Fox LLP

(57) ABSTRACT

A communication control apparatus includes an acquirer that acquires operation information of a moving object having a shielded space therein, and a controller that controls at least one of a channel between a first base station installed in a car in the moving object and a second base station installed on each floor where the car is stoppable, transmission power of the first base station and transmission power of the second base station, and location information for locating a position of a mobile terminal for each floor where the car is stoppable, on the basis of the operation information.

15 Claims, 16 Drawing Sheets

| FLOOR NUMBER | PATTERN | OPEN/CLOSED STATE | ELEVATOR ID | TRANSMISSION-POWER VALUE |
|---|---|---|---|---|
| MOVING | E0 | CLOSED | 0-001 | −10 dB |
| 1ST FLOOR | E1-1 | CLOSED | 1-001 | −10 dB |
| | E1-2 | OPEN | 1-001 | −6 dB |
| 2ND FLOOR | E2-1 | CLOSED | 2-001 | −10 dB |
| | E2-2 | OPEN | 2-001 | −6 dB |
| ⋮ | | | | |
| 8TH FLOOR | E8-1 | CLOSED | 8-001 | −10 dB |
| | E8-2 | OPEN | 8-001 | −6 dB |

| ELEVATOR ID | CURRENT POSITION | MOVING DIRECTION | DESTINATION FLOOR | OPEN/ CLOSED STATE |
|---|---|---|---|---|

FIG. 4

| ELEVATOR ID | ITEM | DESCRIPTION |
|---|---|---|
| 001 | CURRENT POSITION | 2ND FLOOR |
| | MOVING DIRECTION | UP |
| | DESTINATION FLOOR | 3RD FLOOR, 5TH FLOOR |
| | OPEN/CLOSED STATE | OPEN |
| 002 | CURRENT POSITION | 4TH FLOOR |
| | MOVING DIRECTION | DOWN |
| | DESTINATION FLOOR | 2ND FLOOR, 3RD FLOOR |
| | OPEN/CLOSED STATE | CLOSED |
| ⋮ | ⋮ | ⋮ |
| 010 | CURRENT POSITION | 4TH FLOOR–5TH FLOOR |
| | MOVING DIRECTION | UP |
| | DESTINATION FLOOR | 5TH FLOOR, 8TH FLOOR |
| | OPEN/CLOSED STATE | CLOSED |

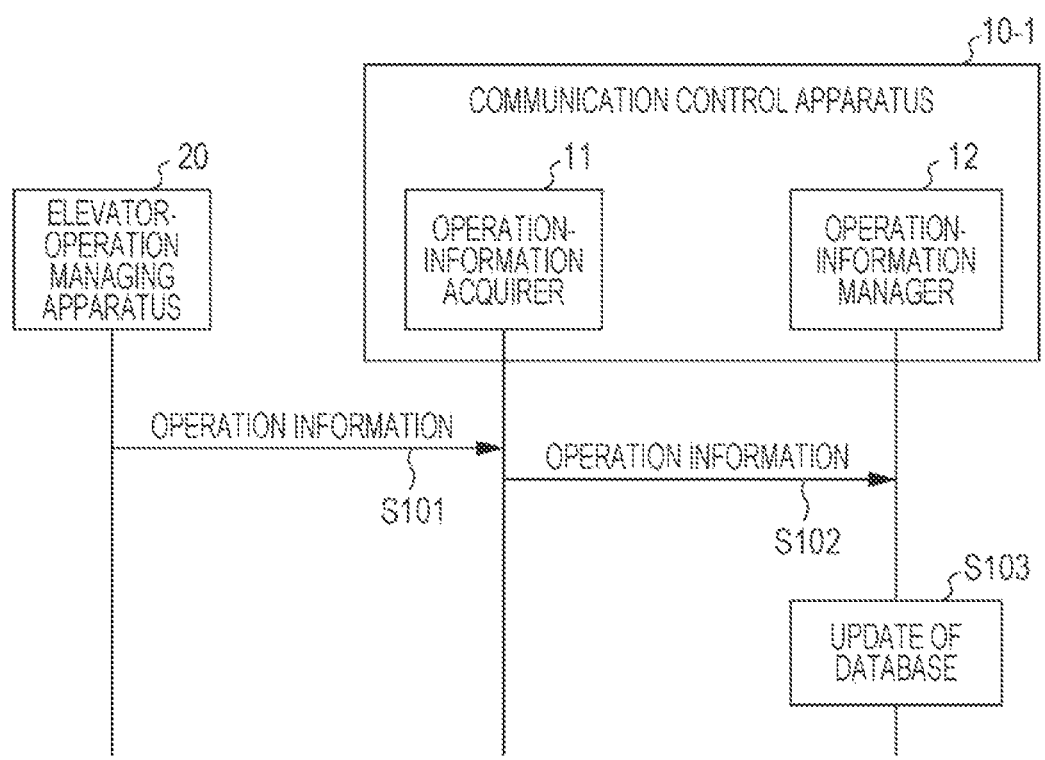

FIG. 8

| FLOOR NUMBER | PATTERN | OPEN/CLOSED STATE | ELEVATOR ID | TRANSMISSION-POWER VALUE |
|---|---|---|---|---|
| MOVING | E0 | CLOSED | 0-001 | −10 dB |
| 1ST FLOOR | E1-1 | CLOSED | 1-001 | −10 dB |
| | E1-2 | OPEN | 1-001 | −6 dB |
| 2ND FLOOR | E2-1 | CLOSED | 2-001 | −10 dB |
| | E2-2 | OPEN | 2-001 | −6 dB |
| ⋮ | | | | |
| 8TH FLOOR | E8-1 | CLOSED | 8-001 | −10 dB |
| | E8-2 | OPEN | 8-001 | −6 dB |

FIG. 9

| FLOOR NUMBER | PATTERN | PRESENCE/ ABSENCE OF CAR | OPEN/ CLOSED STATE | FLOOR BASE STATION ID | TRANSMISSION-POWER VALUE |
|---|---|---|---|---|---|
| 1ST FLOOR | F1-1 | ABSENT | CLOSED | 1-1 | −10 dB |
| | | | | 1-2 | −10 dB |
| | | | | 1-3 | −10 dB |
| | F1-2 | PRESENT | CLOSED | 1-1 | −8 dB |
| | | | | 1-2 | −8 dB |
| | | | | 1-3 | −8 dB |
| | F1-3 | PRESENT | OPEN | 1-1 | −6 dB |
| | | | | 1-2 | −6 dB |
| | | | | 1-3 | −6 dB |
| 2ND FLOOR | F2-1 | ABSENT | CLOSED | 2-1 | −10 dB |
| | | | | 2-2 | −10 dB |
| | | | | 2-3 | −10 dB |
| | F2-2 | PRESENT | CLOSED | 2-1 | −8 dB |
| | | | | 2-2 | −8 dB |
| | | | | 2-3 | −8 dB |
| | F2-3 | PRESENT | OPEN | 2-1 | −6 dB |
| | | | | 2-2 | −6 dB |
| | | | | 2-3 | −6 dB |
| ⋮ | | | | | |
| 8TH FLOOR | F8-1 | ABSENT | CLOSED | 8-1 | −10 dB |
| | | | | 8-2 | −10 dB |
| | | | | 8-3 | −10 dB |
| | F8-2 | PRESENT | CLOSED | 8-1 | −8 dB |
| | | | | 8-2 | −8 dB |
| | | | | 8-3 | −8 dB |
| | F8-3 | PRESENT | OPEN | 8-1 | −6 dB |
| | | | | 8-2 | −6 dB |
| | | | | 8-3 | −6 dB |

INSTALLATION POSITION OF ELEVATOR

INSTALLATION POSITION OF ELEVATOR

INSTALLATION POSITION OF ELEVATOR

COMMUNICATION CONTROL APPARATUS AND COMMUNICATION CONTROL METHOD

CROSS-REFERENCE TO RELATED APPLICATION

This application is based upon and claims the benefit of priority of the prior Japanese Patent Application No. 2012-175175, filed on Aug. 7, 2012, the entire contents of which are incorporated herein by reference.

FIELD

The embodiments discussed herein are related to a communication control apparatus and a communication control method.

BACKGROUND

In mobile communication systems, it has been considered that small base stations that form femtocells, which are small cells with a radius of several tens of meters or less, be installed indoors where it is difficult for radio waves to reach, in order to enable indoor communication (such small base stations may be referred to as "femto base stations" hereinafter).

In order to meet the desires of mobile-terminal users to be able to carry out reliable communication anywhere, it is expected that femto base stations will be installed in various indoor locations in the future. For example, it is conceivable that femto base stations are installed on each floor of a building. In addition, it is conceivable to install femto base stations not only on each floor but also in an elevator car (which may simply be referred to as a "car" hereinafter) in order to enable reliable communication in the elevator in a building.

Since the car moves between multiple floors, handover for a mobile terminal is performed between a base station (which may be referred to as an "elevator base station") installed in the car and the base stations (which may be referred to as "floor base stations" hereinafter) installed on each floor in order to avoid interruption of communication. It is therefore desired that the handover be performed smoothly in order to enhance the quality of service for mobile terminal users.

Since the car moves between multiple floors, the influences of the elevator base stations cause the radio wave environment at each floor to vary depending on the floor where the car is present. In addition, when the door of the car is closed, the car becomes a shielded space where it is difficult for radio waves from the inside of the car to go out and difficult for radio waves from the outside to reach the inside. On the other hand, when the door of the car is open, the car becomes a space where it is easy for radio waves from the inside of the car to go out and easy for radio waves from the outside to reach the inside. Hence, the radio wave environment at each floor also varies depending on the open/closed state of the door of the car. It is therefore desired that appropriate control corresponding to such variations in the radio wave environment be performed in order to enhance the quality of service for mobile terminal users.

Examples of related art include Japanese Laid-open Patent Publication No. 2011-135383 and Japanese Laid-open Patent Publication No. 2011-120095.

SUMMARY

According to an aspect of the embodiments, a communication control apparatus includes an acquirer that acquires operation information of a moving object having a shielded space therein, and a controller that controls at least one of a channel between a first base station installed in a car in the moving object and a second base station installed on each floor where the car is stoppable, transmission power of the first base station and transmission power of the second base station, and location information for locating a position of a mobile terminal for each floor where the car is stoppable, on the basis of the operation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of the format of operation information in the first embodiment;

FIG. 4 illustrates one example of the operation information in the first embodiment;

FIG. 5 is a sequence diagram illustrating an operation (during acquisition of the operation information) of the communication system according to the first embodiment;

FIG. 8 is a table illustrating one example of transmission-power information of elevator base stations in the second embodiment;

FIG. 9 is a table illustrating one example of transmission-power information of floor base stations in the second embodiment;

DESCRIPTION OF EMBODIMENTS

Figure 1:
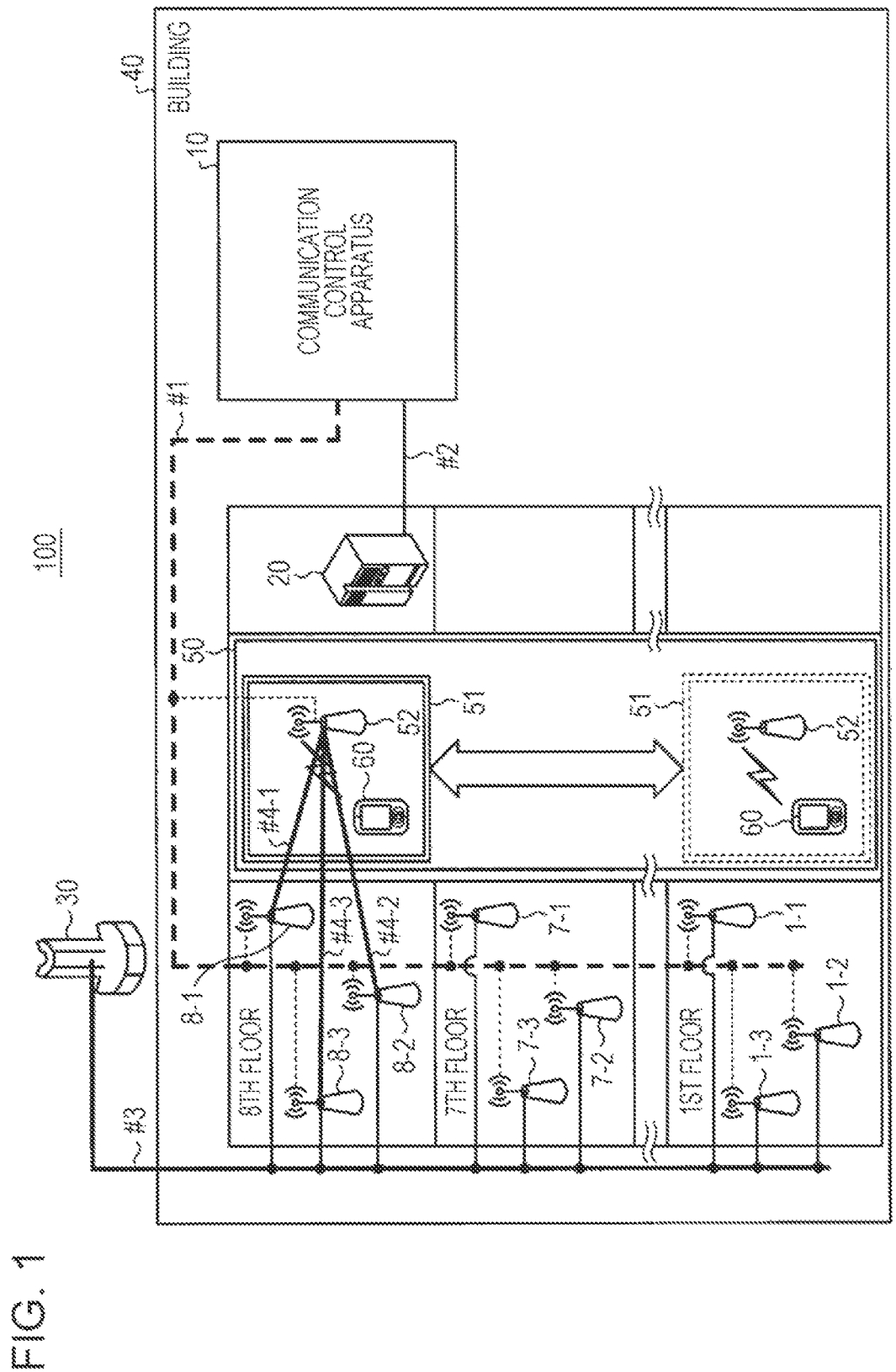
FIG. 1 is a diagram illustrating one example of a communication system according to a first embodiment.

A communication control apparatus and a communication control method according to embodiments of the present disclosure will be described below in detail with reference to the accompanying drawings. It is to be noted that the communication control apparatus and the communication control method according to the present disclosure are not limited to the embodiments described hereinafter. In the embodiments described below, elements having substantially the same functions are denoted by the same reference numerals, and redundant descriptions are not given hereinafter.

First Embodiment

Overview of Communication System

FIG. 1 is a diagram illustrating one example of a communication system according to a first embodiment. As illustrated in FIG. 1, a communication system 100 includes a communication control apparatus 10, an elevator-operation managing apparatus 20, an evolved packet core (EPC) 30 serving as a core network, elevator base stations 52, floor base stations 1-1, 1-2, 1-3, . . . , 7-1, 7-2, 7-3, 8-1, 8-2, and 8-3, and mobile terminals 60.

The communication control apparatus 10 and the elevator-operation managing apparatus 20 are installed in a building 40. An elevator 50 including cars 51 is installed in the building 40. Under the control of the elevator-operation managing apparatus 20, each car 51 moves between multiple floors in the building 40. In FIG. 1, the building 40 has eight floors, that is, first to eighth floors, by way of example.

The elevator base stations 52 are installed in the corresponding cars 51.

The floor base stations 1-1, 1-2, and 1-3 are installed on the first floor of the building 40. The floor base stations 7-1, 7-2, and 7-3 are installed on the seventh floor of the building 40. The floor base stations 8-1, 8-2, and 8-3 are installed on the eighth floor of the building 40. Similarly, the floor base stations 2-1 to 6-3 (not illustrated) are installed on the second to sixth floors of the building 40.

The elevator-operation managing apparatus 20 and the communication control apparatus 10 are connected to each other through an indoor control channel #2. The elevator-operation managing apparatus 20 controls and manages the operation of the elevator 50 and transmits information about the operation of the elevator 50 (the information may simply be referred to as "operation information" hereinafter) to the communication control apparatus 10 through the indoor control channel #2. The elevator-operation managing apparatus 20 transmits the operation information to the communication control apparatus 10 at any of the following timings.

<Transmission Timing 1>

Each time the operation information is updated, the elevator-operation managing apparatus 20 transmits the operation information to the communication control apparatus 10.

<Transmission Timing 2>

The elevator-operation managing apparatus 20 transmits the operation information to the communication control apparatus 10 at predetermined time intervals.

<Transmission Timing 3>

In response to a get request from the communication control apparatus 10, the elevator-operation managing apparatus 20 transmits the operation information to the communication control apparatus 10.

The communication control apparatus 10 and the elevator base stations 52 are connected to each other through an indoor control channel #1. Similarly, the communication control apparatus 10 and the floor base stations 1-1 to 8-3 are connected to each other through the indoor control channel #1. Communication through the indoor control channels #1 is performed based on, for example, Technical Report 069 (TR-069), which is a technical specification for a Customer-Premises Equipment Wide-Area Network (CPE WAN, or CWAN) management protocol.

The EPC 30 and the floor base stations 1-1 to 8-3 are connected to each other through S1 channels #3.

The elevator base stations 52 and the floor base stations 1-1 to 8-3 are connected to each other through X2 channels #4. For example, when one car 51 is present at the eighth floor of the building 40, the corresponding elevator base station 52 and the floor base station 8-1 are connected to each other through an X2 channel #4-1, the elevator base station 52 and the floor base station 8-2 are connected to each other through an X2 channel #4-2, and the elevator base station 52 and the floor base station 8-3 are connected through an X2 channel #4-3.

Each mobile terminal 60 receives data from the EPC 30 and transmits data to the EPC 30 through the corresponding elevator base station 52 or any of the floor base stations 1-1 to 8-3.

In this case, the S1 channels #3 provide connections between the core network, that is, the EPC 30, and the floor base stations 1-1 to 8-3.

The X2 channels #4 are channels based on a technology newly introduced by the 3rd Generation Partnership Project Long Term Evolution (3GPP-LTE). The X2 channels #4 provide direct connections between the elevator base stations 52 and the floor base stations 1-1 to 8-3. Upon establishment of the X2 channel between any of the elevator base stations 52 and any of the floor base stations 1-1 to 8-3, data can be transferred there between without going through the core network. Thus, immediately before handover, one elevator base station 52 serving as a handover source transfers, through the corresponding X2 channel #4 to one of the floor base stations 1-1 to 1-8 serving as a handover target, data that the handover-source elevator base station 52 failed to transfer to one mobile terminal 60 for which the handover is performed. Upon receiving the data through the X2 channel #4, the handover-target floor base station of the floor base stations 1-1 to 1-8 transmits the data to the mobile terminal 60 newly connected to the handover-target floor base station of the floor base stations 1-1 to 1-8 by the handover. This arrangement can reduce data loss during handover. Accordingly, handover involving data transfer through the X2 channel #4 allows the data-processing load in the core network to be reduced compared with handover involving data transfer through the core network.

The S1 channels #3 may be called S1 connections, S1 links, S1 interfaces, or the like. The X2 channels #4 may be called X2 connections, X2 links, X2 interfaces, or the like.

<Configuration of Communication Control Apparatus>

Figure 2:
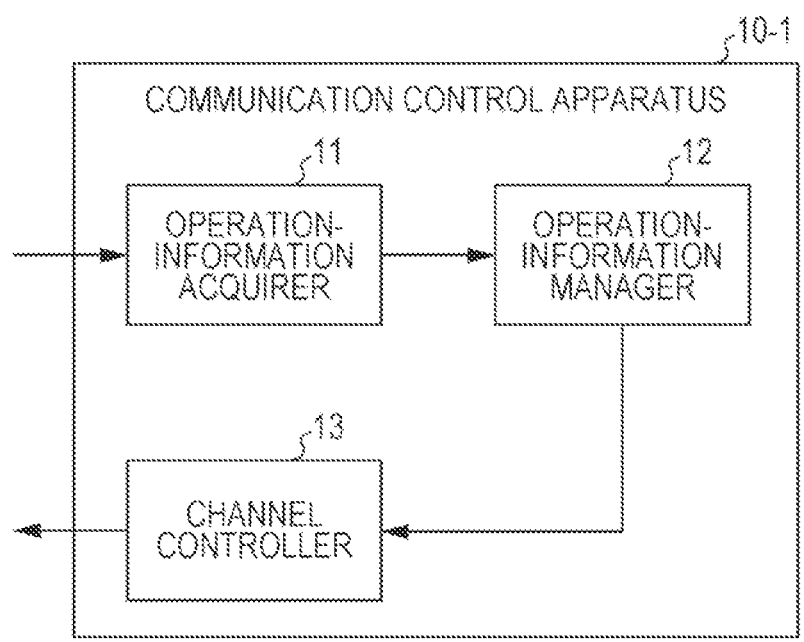
FIG. 2 is a functional block diagram illustrating one example of the communication control apparatus in the first embodiment.

FIG. 2 is a functional block diagram illustrating one example of the communication control apparatus in the first embodiment. As illustrated in FIG. 2, a communication control apparatus 10-1 includes an operation-information acquirer 11, an operation-information manager 12, and a channel controller 13. The communication control apparatus 10-1 illustrated in FIG. 2 corresponds to the communication control apparatus 10 illustrated in FIG. 1.

The operation-information acquirer 11 acquires the operation information from the elevator-operation managing apparatus 20 through the indoor control channel #2. The operation-information acquirer 11 outputs the acquired operation information to the operation-information manager 12.

The operation information will now be described. FIG. 3 illustrates an example of the format of the operation information in the first embodiment.

As illustrated in FIG. 3, operation information 70 has five items, that is, an elevator ID, a current position, a moving direction, a destination floor, and an open/closed state.

The "elevator ID" is a unique identifier for the corresponding elevator 50 and is used to identity it. For example, when three elevators 50 are installed in the building 40, the "elevator ID" is "001", "002", or "003".

The "current position" represents the current position of the corresponding car 51. For example, when the car 51 is in a stop state at the second floor, the "current position" is "2nd floor". For example, when the car 51 is moving between the fourth floor and the fifth floor, the "current position" is "4th floor-5th floor".

The "moving direction" represents the moving direction of the car 51 and, more specifically, indicates "up" or "down".

The "destination floor" indicates destination floors where the car 51 is scheduled to stop. For example, when floor designation buttons for the second floor, third floor, and fifth floor are pressed in the car 51, the "destination floor" indicates "2nd floor, 3rd floor, and 5th floor".

The "open/closed state" indicates the open/closed state of the door of the car 51 and, more specifically, indicates "open" or "closed".

The operation-information manager 12 has an operation information database (not illustrated) and stores, in the operation information database, the operation information input from the operation-information acquirer 11. Each time the operation information is input from the operation-information acquirer 11, the operation-information manager 12 updates the operation information database with the input operation information.

Now, a description will be given of a specific example of the operation information stored in the operation information database. FIG. 4 illustrates one example of the operation information in the first embodiment. The example illustrated in FIG. 4 corresponds to a case in which ten elevators 50 with IDs "001" to "010" are installed in the building 40.

When a predetermined condition is satisfied, the operation-information manager 12 outputs the operation information, stored in the operation information database, to the channel controller 13.

The predetermined condition may be set to, specifically, the following conditions. The operation-information manager 12 may determine whether or not <Condition 1> or <Condition 2> is satisfied, by comparing the operation information stored in the operation information database with the operation information newly input from the operation-information acquirer 11.

<Condition 1> is a condition that the "destination floor" for any one of the elevators 50 is updated in the operation information for the elevators 50. For example, when the destination floors of the car 51 that is currently present at the second floor are the third floor and the fifth floor, the "destination floor" in the operation information is updated from "3rd floor, 5th floor" to "5th floor" when the car 51 arrives at the third floor.

<Condition 2> is a condition that the car 51 in any one of the elevators 50 changes its operation from a stop state to a moving state, that is, a condition that the car 51 in any one of the elevators 50 starts moving. For example, when the car 51 that is present at the fourth floor starts moving toward the fifth floor, the "current position" in the operation information is updated from "4th floor" to "4th floor-5th floor".

The predetermined condition may also be set to either <Condition 1> or <Condition 2> or to both of <Condition 1> and <Condition 2>.

On the basis of the operation information input from the operation-information manager 12, the channel controller 13 establishes and releases the X2 channels #4 between the elevator base station 52 and corresponding floor base stations of the floor base stations 1-1 to 8-3.

<Processing of Channel Controller>

Before the car 51 arrives at the destination floor, the channel controller 13 establishes the X2 channels #4 between the elevator base station 52 and corresponding floor base stations of the floor base stations 1-1 to 8-3, the corresponding floor base stations being installed on the destination floor, on the basis of the operation information.

More specifically, for example, when the operation information indicates a state illustrated in FIG. 4, the channel controller 13 establishes the X2 channels #4 by transmitting an establish request to the elevator base station 52 in a manner described below. The establish request includes the "destination floor".

That is, the channel controller 13 transmits an establish request, which includes the destination floors "3rd floor, 5th floor", to the elevator base station 52, installed in the car 51 in the elevator 50 with ID "001", through the indoor control channel #1. In response to the establish request, the elevator base station 52 establishes the X2 channels #4 with the floor base stations 3-1 to 3-3 and 5-1 to 5-3 installed on the third and fifth floors, which are destination floors. As a result, the elevator base station 52, which is currently present at the second floor, can establish the X2 channels #4 with the floor base stations 3-1 to 3-3 and 5-1 to 5-3 installed on the third and fifth floors, before the car 51 stops at the third floor and the fifth floor.

The channel controller 13 also transmits an establish request including the destination floors "2nd floor, 3rd floor" to the elevator base station 52, installed in the car 51 in the elevator 50 with ID "002", through the indoor control channel #1. In response to the establish request, the elevator base station 52 establishes the X2 channels #4 with the floor base stations 2-1 to 2-3 and 3-1 to 3-3 installed on the second and third floors, which are destination floors. As a result, the elevator base station 52 that is currently preset at the fourth floor can establish the X2 channels #4 with the floor base stations 2-1 to 2-3 and 3-1 to 3-3 installed on the second floor and the third floor, before the car 51 arrives at the second floor and the third floor.

The channel controller 13 also transmits an establish request including the destination floors "5th floor, 8th floor" to the elevator base station 52, installed in the car 51 in the elevator 50 with ID "010", through the indoor control channel #1. In response to the establish request, the elevator base station 52 establishes the X2 channels #4 with the floor base stations 5-1 to 5-3 and 8-1 to 8-3 installed on the fifth floor and the eighth floor, which are destination floors. As a result, the elevator base station 52, which is currently moving between the fourth floor and the fifth floor, can establish the X2 channels #4 with the floor base stations 5-1 to 5-3 and 8-1 to 8-3 installed on the fifth floor and the eighth floor, before the car 51 arrives at the fifth floor and the eighth floor.

For example, the channel controller 13 may also establish the X2 channels #4 by transmitting an establish request to the corresponding floor base stations of the floor base stations 1-1 to 8-3 in the manner described below, the corresponding floor base stations being installed on the destination floors. The establish request includes the "elevator ID" in the operation information.

That is, the channel controller 13 transmits an establish request including the elevator ID "001" to the floor base stations 3-1 to 3-3 and 5-1 to 5-3 installed on the third and fifth floors, which are destination floors of the elevator 50 with ID "001", through the indoor control channel #1. In response to the establish request, the floor base stations 3-1 to 3-3 and 5-1 to 5-3 installed on the third and fifth floors establish the X2 channels #4 with the elevator base station 52 installed in the car 51 in the elevator 50 with ID "001". As a result, the elevator base station 52, which is currently present at the second floor, can establish the X2 channels #4 with the floor base stations 3-1 to 3-3 and 5-1 to 5-3 installed on the third and fifth floors, before the car 51 arrives at the third and fifth floors.

The channel controller 13 also transmits an establish request including the elevator ID "002" to the floor base stations 2-1 to 2-3 and 3-1 to 3-3 installed on the second and third floors, which are destination floors of the elevator 50 with ID "002", through the indoor control channel #1. In response to the establish request, the floor base stations 2-1 to 2-3 and 3-1 to 3-3 installed on the second and third floors establish the X2 channels #4 with the elevator base station 52 installed in the car 51 in the elevator 50 with ID "002". As a result, the elevator base station 52 that is currently present at the fourth floor can establish the X2 channel #4 with the floor base stations 2-1 to 2-3 and 3-1 to 3-3 installed on the second and third floors, before the car 51 arrives at the second and third floors.

The channel controller 13 also transmits an establish request including the elevator ID "010" to the floor base stations 5-1 to 5-3 and 8-1 to 8-3 installed on the fifth and eighth floors, which are the destination floors of the elevator 50 with ID "010", through the indoor control channel #1. In response to the establish request, the floor base stations 5-1 to 5-3 and 8-1 to 8-3 installed on the fifth and eighth floors establish the X2 channels #4 with the elevator base station 52 installed in the car 51 in the elevator 50 with ID "010". As a result, the elevator base station 52, which is currently moving between the fourth floor and the fifth floor, can establish the X2 channels #4 with the floor base stations 5-1 to 5-3 and 8-1 to 8-3 installed on the fifth and eighth floors, before the car 51 arrives at the fifth and eighth floors.

Thus, in order for the channel controller 13 to establish the X2 channels #4 by transmitting an establish request, it is sufficient for the operation information to include at least the "elevator ID" and the "destination floor". However, when only one elevator 50 is installed in the building 40, the operation information may or may not include the "elevator ID".

When the car 51 starts moving, the channel controller 13 releases the X2 channels between the elevator base station 52 and the corresponding floor base stations of the floor base stations 1-1 to 8-3, the corresponding floor base stations being installed on the floor where the car 51 starts moving.

More specifically, for example, when the operation information indicates the state illustrated in FIG. 4, the channel controller 13 releases the X2 channels #4 by transmitting a release request to the elevator base station 52 in the manner described below.

That is, when the car 51 starts moving, the "current position" in the operation information indicates "moving". For example, as illustrated in FIG. 4, since the car 51 in the elevator 50 with ID "010" is moving between the fourth floor and the fifth floor, the "current position" in the operation information indicates "4th floor-5th floor". Also, when the car 51 starts moving, the operation information is input to the channel controller 13 from the operation-information manager 12, as in <Condition 2> described above. Thus, on the basis of the "current position" in the operation information input from the operation-information manager 12, the channel controller 13 can determine the number of the floor where the car 51 started moving. For example, when the "current position" in the input operation information indicates "4th floor-5th floor", the channel controller 13 determines that the number of the floor where the car 51 started moving is the fourth floor. Thus, when the "current position" in the operation information indicates "moving", the channel controller 13 transmits, to the elevator base station 52 installed in the currently moving car 51, a release request including the number of the floor where the car 51 started moving. For example, when the car 51 in the elevator 50 with ID "010" is moving between the fourth floor and the fifth floor, the channel controller 13 transmits a release request including "4th floor" to the elevator base station 52, installed in the car 51 in the elevator 50 with ID "010", through the indoor control channel #1. In response to the release request, the elevator base station 52 releases the X2 channels with the floor base stations 4-1 to 4-3 installed on the fourth floor where the car 51 started moving.

For example, the channel controller 13 may also release the X2 channels #4 by transmitting a release request to the corresponding floor base stations of the floor base stations 1-1 to 8-3 in the manner described below, the corresponding floor base stations being installed on the destination floor. The release request includes the "elevator ID" in the operation information.

That is, the channel controller 13 transmits a release request including the elevator ID "010" to the floor base stations 4-1 to 4-3, installed on the fourth floor where the car 51 in the elevator 50 with ID "010" started moving, through the indoor control channel #1. In response to the release request, the floor base stations 4-1 to 4-3 installed on the fourth floor where the car 51 in the elevator 50 with ID "010" started moving release the X2 channels #4 with the elevator base station 52 installed in the car 51.

Thus, in order for the channel controller 13 to release the X2 channels by transmitting a release request, it is sufficient for the operation information to include at least the "elevator ID" and the "current position". However, when only one elevator 50 is installed in the building 40, the operation information may or may not include the "elevator ID".

In this case, it is preferable that the X2 channels be established when the car 51 is in proximity to the destination floor. In other words, it is preferable that the channel controller 13 establish the X2 channels #4 when the car 51 moves toward the destination floor and is in proximity thereto such that the current position of the car 51 is within a threshold.

More specifically, for example, when the operation information indicates the state illustrated in FIG. 4 and the car 51 is in proximity to the destination floor such that the current position is within the threshold, the channel controller 13 establishes the X2 channels #4 by transmitting an establish request to the elevator base station 52 in the manner described below. The establish request includes the "destination floor". The threshold may be a threshold for a floor difference between the current position of the car 51 and the nearest destination floor of the car 51 in its moving direction. The threshold is set to, for example, "1".

That is, the car 51 in the elevator 50 with ID "001" is currently present at the second floor, and the destination floors of the car 51 in its moving direction are the third and fifth floors. In this case, the difference between the second floor, which is the current position, and the third floor, which is a destination floor, is "1". The difference between the second floor, which is the current position, and the fifth floor, which is a destination floor, is "3". Thus, with respect to the third floor, which is a destination floor, the car 51 is in proximity thereto within the threshold "1". On the other hand, with respect to the fifth floor, which is a destination floor, the car 51 is not in proximity thereto within the threshold "1".

Accordingly, the channel controller 13 transmits an establish request including the destination floor "3rd floor", which is in proximity to the car 51 in the elevator 50 with ID "001" such that the current position of the car 51 is within the threshold, to the elevator base station 52 installed in the car 51 through the indoor control channel #1. In response to the establish request, the elevator base station 52 establishes the X2 channels #4 with the floor base stations 3-1 to 3-3 installed on the third floor, which is a destination floor. As a result, before the car 51 arrives at the third floor, the elevator base station 52, which is currently present at the second floor, can establish the X2 channels #4 with the floor base stations 3-1 to 3-3 installed on the third floor.

On the other hand, the channel controller 13 does not transmit an establish request including the destination floor "5th floor", which is not in proximity to the car 51 in the elevator 50 with ID "001" such that the current position of the car 51 is within the threshold, to the elevator base station 52 installed in the car 51.

Thus, in order for the channel controller 13 to establish the X2 channels #4 by transmitting an establish request when the current position is within the threshold, it is sufficient for the operation information to include at least the "elevator ID", the "current position", the "moving direction", and the "destination floor". However, when only one elevator 50 is installed in the building 40, the operation information may or may not include the "elevator ID".

As described above, the channel controller 13 establishes the X2 channels #4 with the corresponding floor base stations of the floor base stations 1-1 to 8-3, the corresponding floor base stations being installed on, of the destination floors of the car 51 in its moving direction, the destination floor at a distance where the current position of the car 51 is within the threshold.

<Operation of Communication System>

FIG. 5 is a sequence diagram illustrating an operation (during acquisition of the operation information) of the communication system according to the first embodiment.

The elevator-operation managing apparatus 20 transmits the operation information to the communication control apparatus 10-1 through the indoor control channel #2 (in step S101).

The operation-information acquirer 11 in the communication control apparatus 10-1 acquires the operation information and outputs the operation information to the operation-information manager 12 (in step S102).

The operation-information manager 12 updates the operation information database with the operation information input from the operation-information acquirer 11 (in step S103).

Figure 6:
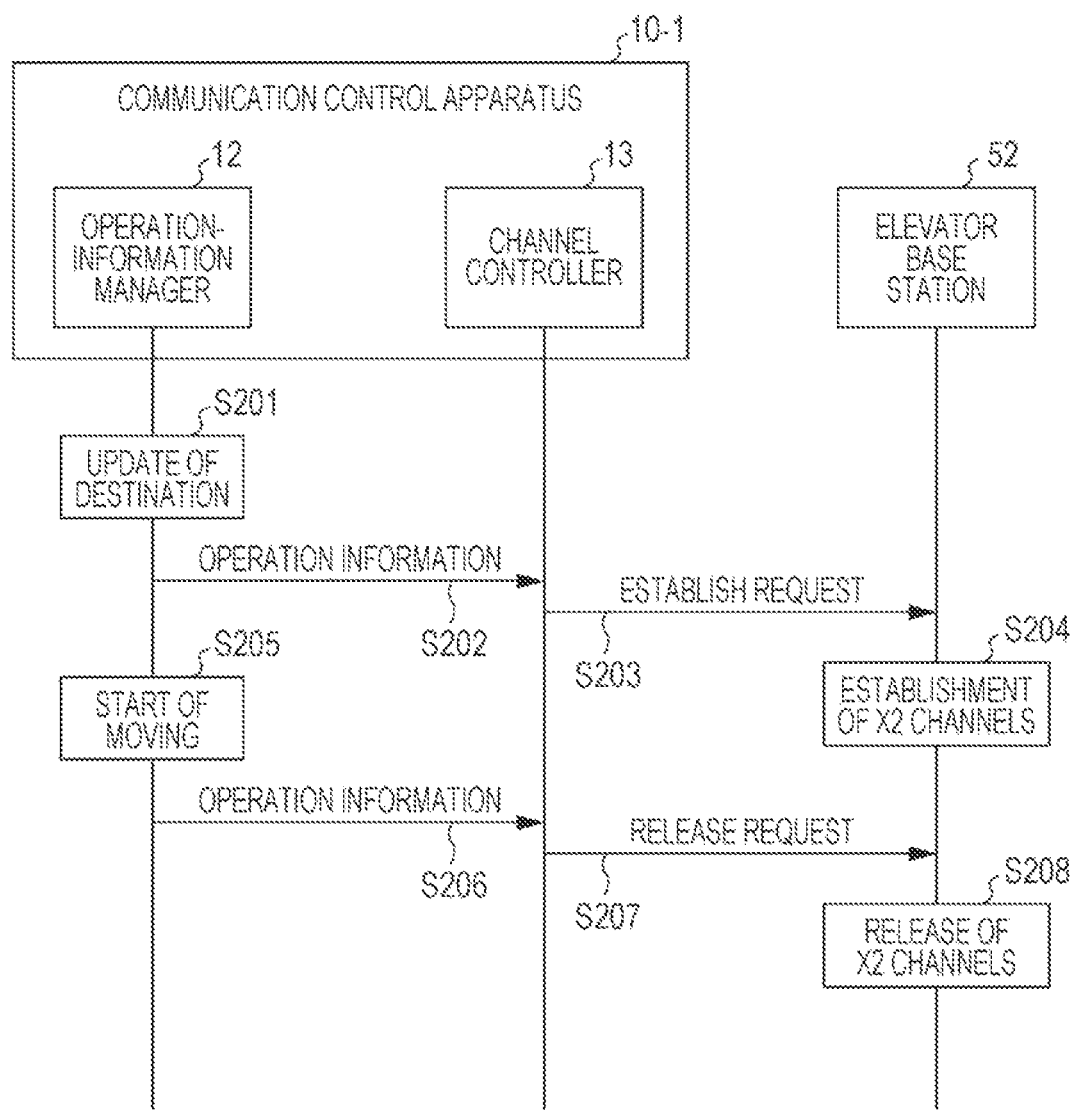
FIG. 6 is a sequence diagram illustrating an operation (during control of the channels) of the communication system according to the first embodiment.

FIG. 6 is a sequence diagram illustrating an operation (during control of the channels) of the communication system according to the first embodiment. FIG. 6 illustrates one example of a case in which the operation-information manager 12 outputs the operation information to the channel controller 13 when <Condition 1> or <Condition 2> is satisfied. The example illustrated in FIG. 6 also corresponds to a case in which the channel controller 13 transmits an establish request to the elevator base station 52.

When the "destination floor" of any of the elevators 50 is updated in the operation information of the elevators 50 (in step S201), the operation-information manager 12 in the communication control apparatus 10-1 outputs the operation information to the channel controller 13 (in step S202).

On the basis of the operation information, the channel controller 13 transmits an establish request to the corresponding elevator base station 52 through the indoor control channel #1 (in step S203).

Upon receiving the establish request, the elevator base station 52 establishes the X2 channels #4 with the corresponding floor base stations of the floor base stations 1-1 to 8-3 (in step S204).

When the car 51 in any of the elevators 50 starts moving (in step S205), the operation-information manager 12 outputs the operation information to the channel controller 13 (in step S206).

On the basis of the operation information, the channel controller 13 transmits a release request to the corresponding elevator base station 52 through the indoor control channel #1 (in step S207).

Upon receiving the release request, the elevator base station 52 releases the X2 channels #4 with the corresponding floor base stations of the floor base stations 1-1 to 8-3 (in step S208).

According to the first embodiment, the operation-information acquirer 11 in the communication control apparatus 10-1 acquires the operation information of the elevators 50, as described above. On the basis of the operation information of the elevators 50, the channel controller 13 controls the X2 channels #4 between the elevator base station 52 installed in the car 51 in the elevator 50 and the corresponding floor base stations of the floor base stations 1-1 to 8-3, the corresponding floor base stations being installed on each floor where the elevator 50 can stop.

With this arrangement, the X2 channels #4 can be appropriately controlled according to the operating state of each elevator 50, thus making it possible to enhance the quality of service for mobile-terminal users who ride the car 51 in the elevator 50.

In addition, according to the first embodiment, before the car 51 arrives at the destination floor, the channel controller 13 establishes the X2 channels #4 between the elevator base station 52 and the corresponding floor base stations of the floor base stations 1-1 to 8-3, the corresponding floor base stations being installed on the destination floor, on the basis of the elevator ID and the destination floor.

Thus, the X2 channels #4 between the elevator base station 52 and the corresponding floor base stations of the floor base stations 1-1 to 8-3, the corresponding floor base stations being installed on the destination floor, are established in advance. Accordingly, before the car 51 arrives at the destination floor, data can be transmitted from the handover-source elevator base station 52 to the handover-destination floor base stations of the floor base stations 1-1 to 8-3. Thus, before the car 51 arrives at the destination floor, data for the handover-target mobile terminal 60 that is present in the car 51 can be transferred from the elevator base station 52 to the corresponding floor base stations of the floor base stations 1-1 to 8-3. Thus, the mobile terminal 60 can perform handover smoothly. Accordingly, when the mobile terminal 60 moves from the car 51 to any of the floors, no communication interruption occurs. Thus, it is possible to enhance the quality of service for mobile terminal users who ride the cars 51 in the elevators 50.

In addition, according to the first embodiment, when the car 51 moves toward the destination floor and is in proximity thereto such that the current position of the car 51 is within the threshold, the channel controller 13 establishes the X2 channels #4 between the elevator base station 52 and the corresponding floor base stations of the floor base stations 1-1 to 8-3, the corresponding floor base stations being installed on the destination floor, on the basis of the elevator ID, the destination floor, the current position, and the moving direction.

With this arrangement, the elevator base station 52 can establish the X2 channels with only the corresponding floor base stations of the floor base stations 1-1 to 8-3, the corresponding floor base stations being installed on the destination floor in proximity to the current position of the car 51. In other words, the elevator base station 52 is capable of not establishing the X2 channels #4 with the corresponding floor base stations of the floor base stations 1-1 to 8-3, the corresponding floor base stations being installed on the destination floor that is not in proximity to the current position of the car 51. That is, the establishment of the X2 channels #4 can be restricted to only connections between the elevator base station 52 and the floor base stations of the floor base stations 1-1 to 8-3, the floor base stations being installed on the floor(s) in proximity to the current position of the car 51. Thus, the number of sessions using the X2 channels #4 can be reduced compared with a case in which the X2 channels are established with the floor base stations 1-1 to 8-3 on all destination floors. It is therefore possible to reduce the possibility that sessions using the X2 channels #4 become unavailable when there is an upper limit for the number of sessions using the X2 channels #4. In particular, the possibility that sessions using the X2 channels #4 become unavailable can be reduced, for example, when multiple elevators 50 are installed in the building 40, when a large number of floor base stations are installed on each floor, or when there are a large number of floors in the building 40.

In addition, according to the first embodiment, when the car 51 starts moving, the channel controller 13 releases the X2 channels #4 between the elevator base station 52 and the corresponding floor base stations of the floor base stations 1-1 to 8-3, the corresponding floor base stations being installed on the floor where the car 51 starts moving, on the basis of the current position and the elevator ID.

With this arrangement, since the X2 channels #4 that are not in use can be released, it is possible to efficiently operate the X2 channels #4 while minimizing the number of X2 channels #4 to be established.

Second Embodiment

Configuration of Communication Control Apparatus

Figure 7:
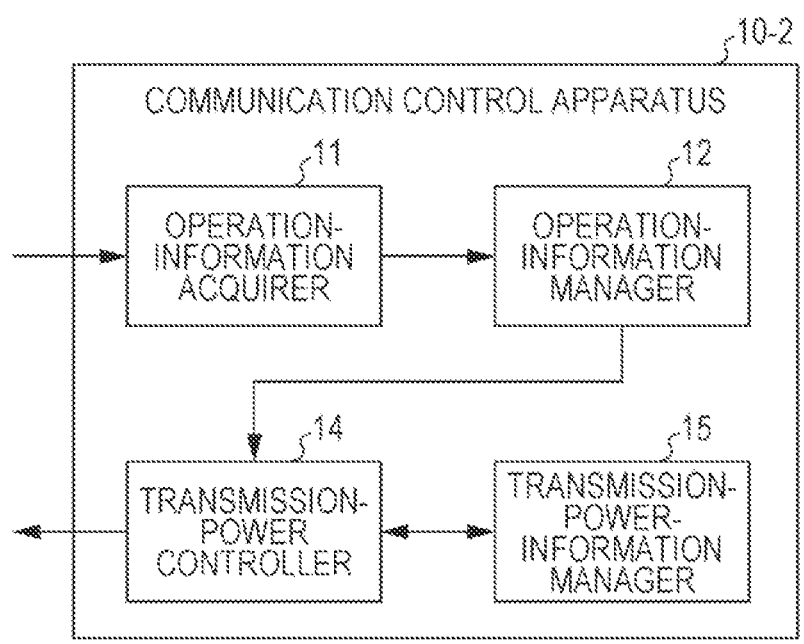
FIG. 7 is a functional block diagram illustrating one example of a communication control apparatus according to a second embodiment.

FIG. 7 is a functional block diagram illustrating one example of a communication control apparatus according to a second embodiment. As illustrated in FIG. 7, a communication control apparatus 10-2 includes an operation-information acquirer 11, an operation-information manager 12, a transmission-power controller 14, and a transmission-power-information manager 15. The communication control apparatus 10-2 illustrated in FIG. 7 corresponds to the communication control apparatus 10 illustrated in FIG. 1.

The operation-information manager 12 stores and updates the operation information, as in the first embodiment. In the second embodiment, however, a predetermined condition for outputting the operation information from the operation-information manager 12 to the transmission-power controller 14 is different from the predetermined condition in the first embodiment.

More specifically, the operation-information manager 12 outputs the operation information, stored in an operation information database, to the transmission-power controller 14 when <Condition 2> described above or <Condition 3> described below is satisfied. The operation-information manager 12 may determine whether or not <Condition 3> described below is satisfied, by comparing the operation information stored in the operation information database with the operation information newly input from the operation-information acquirer 11.

<Condition 3> is a condition that the "open/closed state" of any of the elevators 50 is updated in the operation information of the elevators 50. For example, when the door of the car 51 changes from an open state to a closed state, the "open/closed state" in the operation information is updated from "open" to "closed". When the door of the car 51 changes from the closed state to the open state, the "open/closed state" in the operation information is updated from "closed" to "open".

On the basis of the operation information input from the operation-information manager 12, the transmission-power controller 14 controls the transmission power of the elevator base station 52 and the transmission power of each of the floor base stations 1-1 to 8-3.

The transmission-power-information manager 15 has a transmission-power information database (not illustrated) and stores, in the transmission-power information database, transmission-power information illustrated in FIGS. 8 and 9. FIG. 8 is a table illustrating one example of the transmission-power information of the elevator base stations in the second embodiment. FIG. 9 is a table illustrating one example of the transmission-power information of the floor base stations in the second embodiment. FIG. 8 illustrates only the transmission-power information of the elevator base station 52 installed in the car 51 in the elevator 50 with ID "001", by way of example.

<Processing of Transmission-Power Controller>

On the basis of the "current position" and the "open/closed state" in the operation information, the transmission-power controller 14 controls the transmission power of the elevator base station 52 and the transmission power of each of the floor base stations 1-1 to 8-3. In order to perform transmission-power control in the second embodiment, it is sufficient for the operation information to include at least the "elevator ID", the "current position", and the "open/closed state". However, when only one elevator 50 is installed in the building 40, the operation information may or may not include the "elevator ID". The transmission-power controller 14 performs transmission-power control in accordance with the transmission-power information stored in the transmission-power information database in the transmission-power-information manager 15.

More specifically, for example, when the transmission-power information is the information illustrated in FIGS. 8 and 9, the transmission-power controller 14 performs transmission-power control by transmitting a transmission-power control command to the elevator base station 52 and the corresponding floor base stations of the floor base stations 1-1 to 8-3 in the manner described below. The transmission-power control command includes a "transmission-power value".

That is, when the elevator 50 with ID "001" is moving, the transmission-power controller 14 selects pattern EU in accordance with the transmission-power information illustrated in FIG. 8. The transmission-power controller 14 then transmits a transmission-power control command including a transmission-power value of −10 dB to the elevator base station 52 installed in the car 51 in the elevator 50 with ID "001". In accordance with the transmission-power control command, the elevator base station 52 sets the transmission power to −10 dB.

When the current position of the car 51 in the elevator 50 with ID "001" is the first floor and the door of the car 51 is closed, the transmission-power controller 14 selects pattern E1-1 in accordance with the transmission-power information illustrated in FIG. 8. The transmission-power controller 14 then transmits a transmission-power control command including a transmission-power value of −10 dB to the elevator base station 52 installed in the car 51 in the elevator 50 with ID "001". In accordance with the transmission-power control command, the elevator base station 52 sets the transmission power to −10 dB.

When the current position of the car 51 in the elevator 50 with ID "001" is the first floor and the door of the car 51 is open, the transmission-power controller 14 selects pattern E1-2 in accordance with the transmission-power information illustrated in FIG. 8. The transmission-power controller 14 then transmits a transmission-power control command including a transmission-power value of −6 dB to the elevator base station 52 installed in the car 51 in the elevator 50 with ID "001". In accordance with the transmission-power control command, the elevator base station 52 sets the transmission power to −6 dB.

With respect to the second to eighth floors, the transmission-power controller 14 similarly controls the transmission power of the elevator base station 52.

In this case, the operation-information manager 12 may also output the operation information to the transmission-power-information manager 15. In accordance with the current position of the car 51, the transmission-power-information manager 15 may update the elevator ID, as illustrated in FIG. 8. More specifically, for example, when the car 51 in the elevator 50 with ID "001" is moving, the transmission-power-information manager 15 updates the elevator ID to "0-001". When the car 51 in the elevator 50 with ID "001" is present at the first floor, the transmission-power-information manager 15 updates the elevator ID to "1-001". When the car 51 in the elevator 50 with ID "001" is present at the second floor, the transmission-power-information manager 15 updates the elevator ID to "2-001". Similar operations are performed on the third to eighth floors. As described above, the elevator ID is sequentially updated in accordance with the number of the floor where the car 51 is currently present. Thus, only referring to the "elevator ID" field in the transmission-power information makes it possible to determine the current position of the car 51, that is, the current position of the elevator base station 52.

When the car 51 is not present at the first floor, the transmission-power controller 14 selects pattern F1-1 in accordance with the transmission-power information illustrated in FIG. 9. The transmission-power controller 14 then transmits a transmission-power control command including a transmission-power value of −10 dB to the floor base stations 1-1 to 1-3 installed on the first floor. In accordance with the transmission-power control command, the floor base stations 1-1 to 1-3 sets the transmission power to −10 dB.

When the car 51 is present at the first floor and the door of the car 51 is closed, the transmission-power controller 14 selects pattern F1-2 in accordance with the transmission-power information illustrated in FIG. 9. The transmission-power controller 14 then transmits a transmission-power control command including a transmission-power value of −8 dB to the floor base stations 1-1 to 1-3 installed on the first floor. In accordance with the transmission-power control command, the floor base stations 1-1 to 1-3 sets the transmission power to −8 dB.

When the car 51 is present at the first floor and the door of the car 51 is open, the transmission-power controller 14 selects pattern F1-3 in accordance with the transmission-power information illustrated in FIG. 9. The transmission-power controller 14 then transmits a transmission-power control command including a transmission-power value of −6 dB to the floor base stations 1-1 to 1-3 installed on the first floor. In accordance with the transmission-power control command, the floor base station 1-1 to 1-3 sets the transmission power to −6 dB.

Similarly, the transmission-power controller 14 controls the transmission power of each of the floor base stations 2-1 to 8-3 on the second to eighth floors.

<Operation of Communication System>

Figure 10:
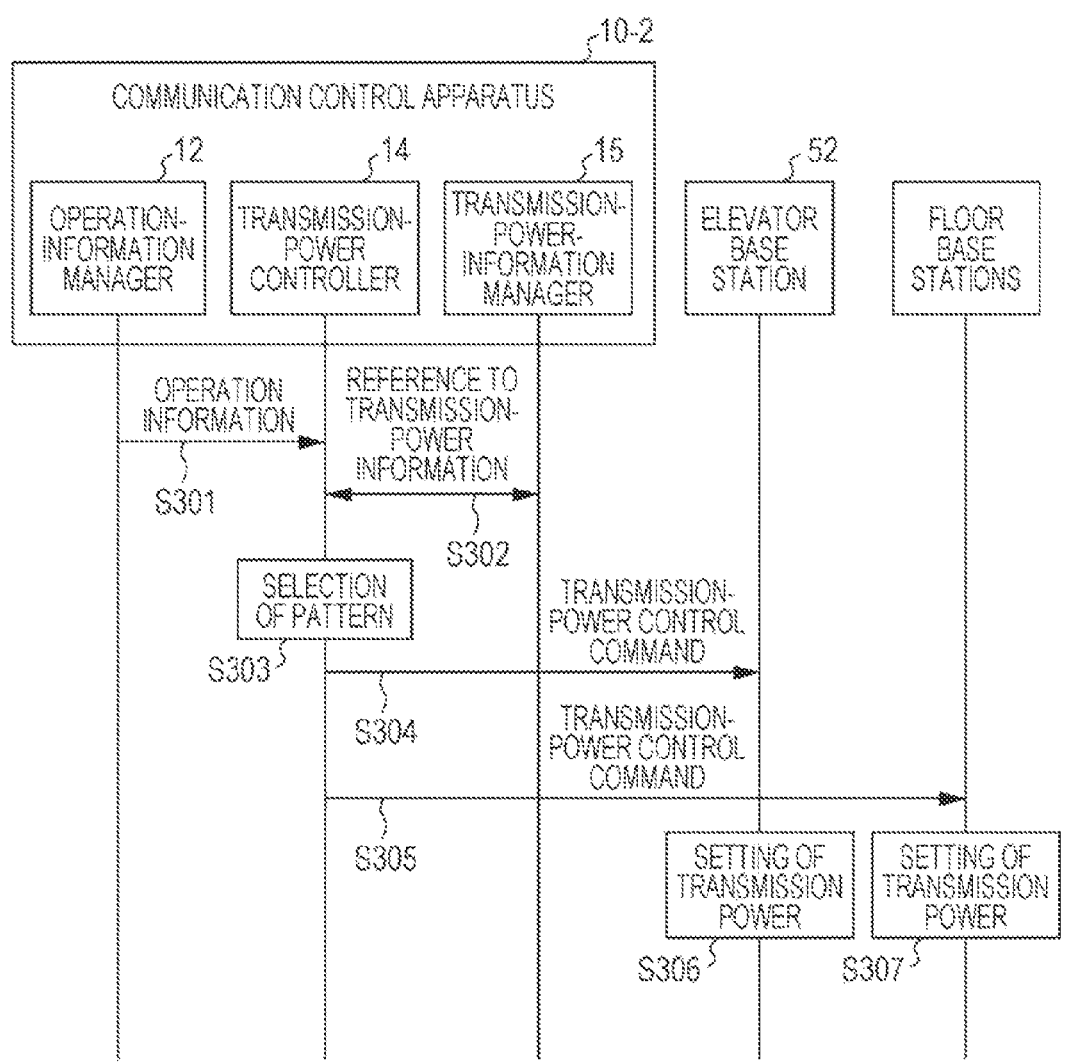
FIG. 10 is a sequence diagram illustrating an operation of a communication system in the second embodiment.

FIG. 10 is a sequence diagram illustrating an operation of the communication system in the second embodiment.

The operation-information manager 12 in the communication control apparatus 10-2 outputs the operation information to the transmission-power controller 14 (in step S301).

On the basis of the operation information, the transmission-power controller 14 refers to the transmission-power information, stored in the transmission-power information database in the transmission-power-information manager 15 (in step S302), to select one of the patterns in the transmission-power information for each of the base stations 1-1 to 8-3 (in step S303).

The transmission-power controller 14 transmits transmission-power control commands including the transmission-power values corresponding to the selected patterns to the elevator base station 52 and the floor base stations 1-1 to 8-3 (in steps S304 and S305).

The elevator base station 52 sets the transmission power thereof to the transmission-power value included in the transmission-power control command (in step S306).

The floor base stations 1-1 to 8-3 also set the transmission powers thereof to the transmission-power values included in the transmission-power control commands (in step S307).

According to the second embodiment, the operation-information acquirer 11 in the communication control apparatus 10-2 acquires the operation information of the elevators 50, as described above. On the basis of the operation information of the elevators 50, the transmission-power controller 14 controls the transmission power of the elevator base station 52 and the transmission power of each of the floor base stations 1-1 to 8-3.

This arrangement makes it possible to perform appropriate transmission-power control corresponding to the operating state of each elevator 50. Thus, with a relatively simple configuration, it is possible to avoid a communication throughput reduction due to radio-wave interference. It is therefore possible to enhance the quality of service for mobile terminal users who ride the cars 51 in the elevators 50.

The transmission-power controller 14 also performs control so that the transmission-power value of the elevator base station 52 when the door of the car 51 is open is smaller than the transmission-power value of the elevator base station 52 when the door of the car 51 is closed.

This arrangement can reduce the amount of radio wave interference from the elevator base station 52 to the floor base stations 1-1 to 8-3 when the door of the car 51 is open and thus can avoid a communication-throughput reduction due to radio-wave interference.

The transmission-power controller 14 also performs control so that the transmission-power values of the floor base stations installed on the floor where the car 51 is present are smaller than the transmission-power values of the floor base stations installed on the floors where the car 51 is not present.

This arrangement can reduce the amount of radio wave interference from the floor base stations on the floor where the elevator base station 52 is currently present to the elevator base station 52 and thus can avoid a communication-throughput reduction due to radio-wave interference.

The transmission-power controller 14 also performs control so that the transmission-power values of the floor base stations when the door of the car 51 is open are smaller than the transmission-power values of the floor base stations when the door of the car 51 is closed.

This arrangement can reduce the amount of radio wave interference from the floor base stations 1-1 to 8-3 to the elevator base station 52 when the door of the car 51 is open and thus can avoid a communication-throughput reduction due to radio-wave interference.

Third Embodiment

Configuration of Communication Control Apparatus

Figure 11:
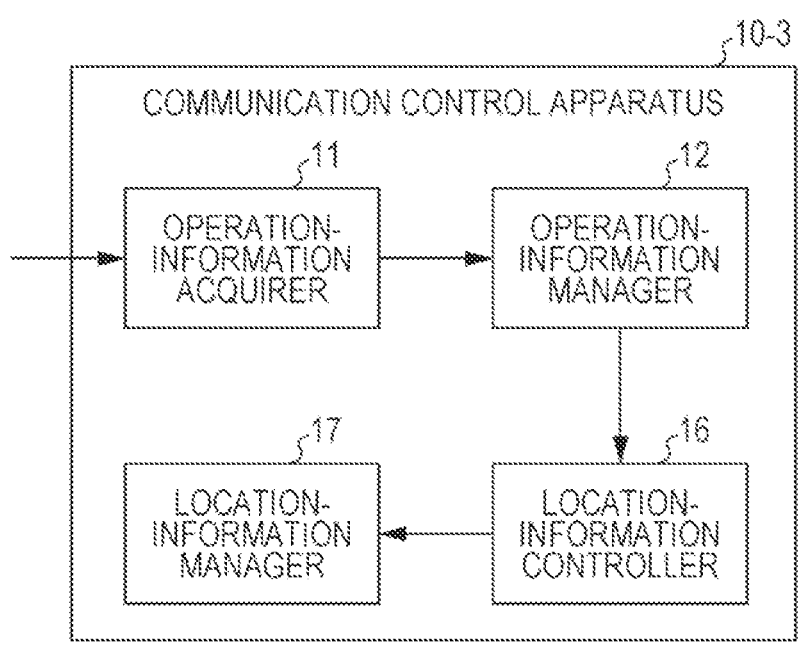
FIG. 11 is a functional block diagram illustrating one example of a communication control apparatus according to a third embodiment.

FIG. 11 is a functional block diagram illustrating one example of a communication control apparatus according to a third embodiment. As illustrated in FIG. 11, a communication control apparatus 10-3 includes an operation-information acquirer 11, an operation-information manager 12, a location-information controller 16, and a location-information manager 17. The communication control apparatus 10-3 illustrated in FIG. 11 corresponds to the communication control apparatus 10 illustrated in FIG. 1.

The operation-information manager 12 stores and updates the operation information, as in the first embodiment. In the third embodiment, however, a predetermined condition for outputting the operation information from the operation-information manager 12 to the location-information controller 16 is different from the predetermined condition in the first embodiment.

More specifically, when <Condition 2> described above or <Condition 3> described above is satisfied, the operation-information manager 12 outputs the operation information, stored in an operation information database, to the location-information controller 16.

On the basis of the operation information input from the operation-information manager 12, the location-information controller 16 controls, for each floor, location information for locating the mobile terminal 60.

Figure 12:
FIG. 12 is a table illustrating one example of location information (for a case in which the car is absent and the door is closed) in the third embodiment.
Figure 13:
FIG. 13 is a table illustrating one example of location information (for a case in which the car is present and the door is closed) in the third embodiment.
Figure 14:
FIG. 14 is a table illustrating one example of location information (for a case in which the car is present and the door is open) in the third embodiment.

The location-information manager 17 has a location information database (not illustrated) and stores and manages, in the location information database, location information illustrated in FIG. 12, 13, or 14. FIG. 12 is a table illustrating one example of location information (for a case in which the car 51 is absent and the door is closed) in the third embodiment. FIG. 13 is a table illustrating one example of location information (for a case in which the car 51 is present and the door is closed) in the third embodiment. FIG. 14 is a table illustrating one example of location information (for a case in which the car 51 is present and the door is open) in the third embodiment. Under the control of the location-information controller 16, the location information stored in the location information database is updated to any of the location information illustrated in FIGS. 12 to 14.

The location information illustrated in FIGS. 12 to 14 is location information for the same floor. In FIGS. 12 to 14, one floor is depicted in a two-dimensional plane defined by an X axis and a Y axis and the two-dimensional plane is sectioned into multiple areas defined by N rows by M columns. In the examples illustrated in FIGS. 12 to 14, one floor is sectioned into 100 areas defined by 10 rows by 10 columns. One elevator 50 is installed in the areas surrounded by a thick line at the lower right portion in each of FIGS. 12 to 14. The examples illustrated in FIGS. 12 to 14 also correspond to a case in which three floor base stations are installed on one floor.

For example, when the examples illustrated in FIGS. 12 to 14 are for the first floor, the value in the first section in each of the areas illustrated in FIGS. 12 to 14 represents the reception-power value [dB] of signals at the mobile terminal 60, the signals being transmitted from the floor base station 1-1. Similarly, the value in the second section in each area represents the reception-power value [dB] of signals at the mobile terminal 60, the signals being transmitted from the floor base station 1-2, and the value in the third section in each area represents the reception-power value [dB] of signals at the mobile terminal 60, the signals being transmitted from the floor base station 1-3. Also, the value in the fourth section in each area represents the reception-power value [dB] of signals at the mobile terminal 60, the signals being transmitted from the elevator base station 52. That is, FIGS. 12 to 14 are reception-power-value maps for mobile terminals 60 in the individual areas on one floor.

Such location information, which serves as reception-power-value maps created in advance, may be used to match the reception-power value in each area with the current actual reception-power value of the mobile terminal 60, thereby making it possible to determine in which area on the floor the mobile terminal 60 is currently present. Such reception-power-value matching for locating mobile terminal is called RF pattern matching.

<Processing of Location-Information Controller>

The location-information controller 16 controls the location information on the basis of the "current position" and the "open/closed state" in the operation information. In order for performing location information control in the third embodiment, it is sufficient for the operation information to include at least the "elevator ID", the "current position", and the "open/closed state". However, when only one elevator 50 is installed in the building 40, the operation information may or may not include the "elevator ID".

More specifically, for example, when the location information illustrated in FIGS. 12 to 14 is for the first floor, the location-information controller 16 controls the location information in the manner described below.

That is, when the car 51 is not present at the first floor, the location-information controller 16 updates the location information, stored in the location information database for the location-information manager 17, to the location information illustrated in FIG. 12.

When the car 51 is present at the first floor and the door of the car 51 is closed, the location-information controller 16 updates the location information, stored in the location information database for the location-information manager 17, to the location information illustrated in FIG. 13.

When the car 51 is present at the first floor and the door of the car 51 is open, the location-information controller 16 updates the location information, stored in the location information database for the location-information manager 17, to the location information illustrated in FIG. 14.

That is, on the basis of the current position of the car 51 and the open/closed state of the door of the car 51, the location-information controller 16 updates, in the location information, the reception-power value of signals at the mobile terminal 60, the signals being transmitted from the elevator base station 52, and the reception-power value of signals at the mobile terminal 60, the signals being transmitted from the floor base stations 1-1 to 1-3.

Now, a comparison is made between a case in FIG. 12 (a case in which the car 51 is absent and the door is closed), a case in FIG. 13 (a case in which the car 51 is present and the door is closed), and a case in FIG. 14 (a case in which the car 51 is present and the door is open). The reception-power value in the fourth section in each of the areas corresponding to the installation position of the elevator 50 is 0 dB in FIG. 12 and is −10 dB in FIGS. 13 and 14. With respect to the reception-power values in the first to third sections corresponding to the positions adjacent to the installation position of the elevator 50, the reception-power values illustrated in FIGS. 13 and 14 are generally smaller than the reception-power values illustrated in FIG. 12.

That is, the location-information controller 16 updates, in the location information for the first floor, the reception-power value in the fourth section in each of the areas corresponding to the installation position of the elevator 50 so that the reception-power value when the car 51 is present at the first floor is smaller than the reception-power value when the car 51 is not present at the first floor.

With this arrangement, in accordance with the current position of the car 51, the location information can be updated to appropriate location information considering the transmission-power control of the elevator base station 52.

The location-information controller 16 also updates, in the location information for the first floor, the reception-power values in the first to third sections in the areas corresponding to positions adjacent to the installation position of the elevator 50 so that the reception-power values when the car 51 is present at the first floor are smaller than the reception-power values when the car 51 is not present at the first floor.

With this arrangement, in accordance with the current position of the car 51, the location information can be updated to appropriate location information considering the transmission-power control of each of the floor base stations 1-1 to 8-3.

Comparison between the case in FIG. 13 (the case in which the car 51 is present and the door is closed) and the case in FIG. 14 (the case in which the car 51 is present and the door is open) indicates that, with respect to the reception-power value in the fourth section in the area corresponding to a position adjacent to the installation position of the elevator 50, the reception-power-value in FIG. 14 is smaller than the reception-power value in FIG. 13. Thus, the location-information controller 16 updates, in the location information for the first floor, the reception-power value in the fourth section in the area corresponding to a position adjacent to the installation position of the elevator 50 so that the reception-power value when the door of the car 51 is open is smaller than the reception-power value when the door of the car 51 is closed.

With this arrangement, in accordance with the open/closed state of the door of the car 51, the location information can be updated to appropriate location information considering the transmission-power control of the elevator base station 52.

<Operation of Communication System>

Figure 15:
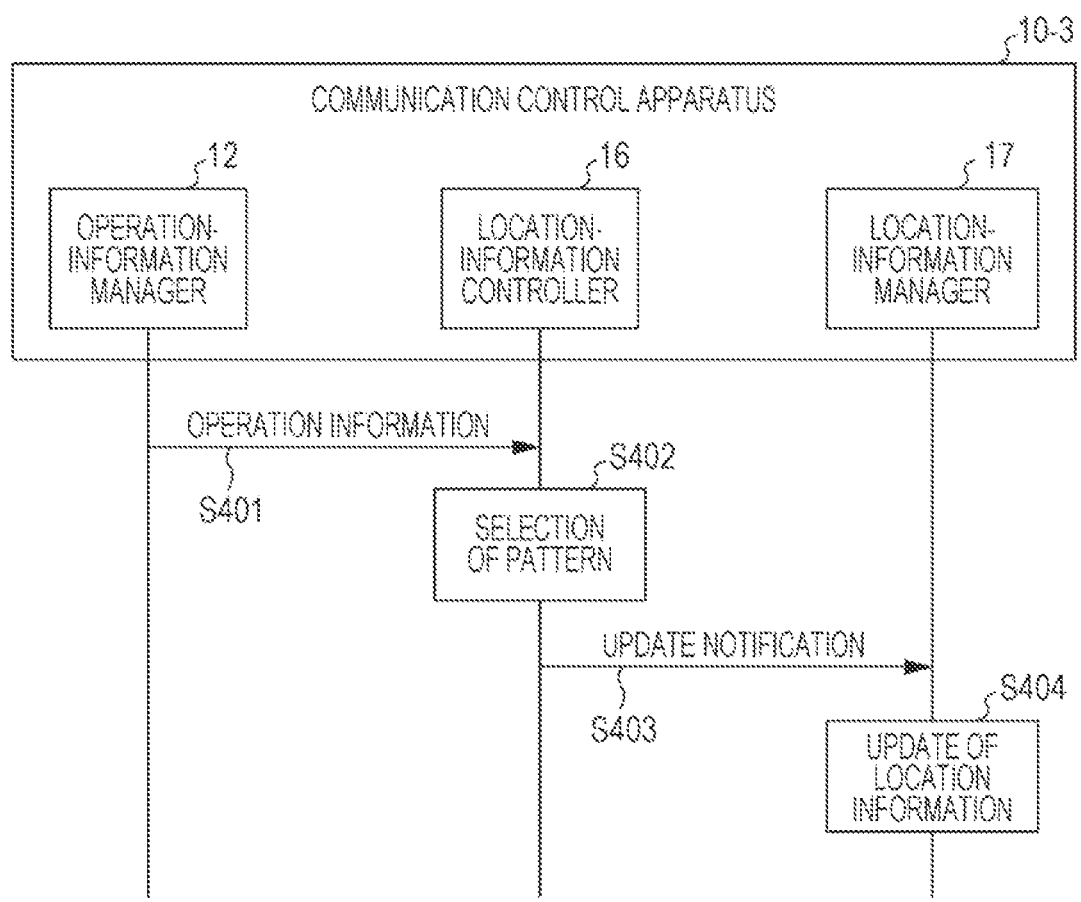
FIG. 15 is a sequence diagram illustrating an operation of the communication control apparatus according to the third embodiment.

FIG. 15 is a sequence diagram illustrating an operation of the communication control apparatus according to the third embodiment.

The operation-information manager 12 in the communication control apparatus 10-3 outputs the operation information to the location-information controller 16 (in step S401).

On the basis of the operation information, the location-information controller 16 selects, for each floor, one of the patterns in the location information (in step S402). In this case, FIG. 12 corresponds to pattern 1, that is, a case in which the car 51 is absent and the door is closed, FIG. 13 corresponds to pattern 2, that is, a case in which the car 51 is present and the door is closed, and FIG. 14 corresponds to pattern 3, that is, a case in which the car 51 is present and the door is open.

The location-information controller 16 outputs an update notification including information indicating the selected pattern to the location-information manager 17 (in step S403).

In accordance with the update notification, the location-information manager 17 updates the location information managed in the location information database (in step S404).

According to the third embodiment, the operation-information acquirer 11 in the communication control apparatus 10-3 acquires the operation information of the elevators 50, as described above. On the basis of the operation information of the elevator 50, the location-information controller 16 controls the location information for locating the mobile terminals 60 for each floor where the car 51 stops.

With this arrangement, in accordance with the operating state of the elevator 50, the location information can be appropriately controlled considering the transmission-power control for each of the base stations 1-1 to 8-3. Thus, it is possible to reduce the amount of location-information error resulting from the operating state of the elevator 50. Accordingly, it is possible to suppress a reduction in the accuracy of locating the mobile terminals, the reduction resulting from the operating state of each elevator 50. It is therefore possible to enhance the quality of service for mobile-terminal users who ride the car 51 in the elevator 50.

Other Embodiments

[1] In the first to third embodiments, the car 51 in the elevator 50 has been described above as an example of a moving object having a shielded space therein. However, the moving object having a shielded space therein is not limited to the car 51 in the elevator 50. The disclosed technology may be applied to not only the car 51 in the elevator 50 but also any moving object having a shielded space therein. That is, in a communication control apparatus, an acquirer may acquire operation information of a moving object having a shielded space therein and a controller may control at least one of a channel between a first base station installed in the shielded space and a second base station installed at a position where the moving object stops, transmission power of the first base station and transmission power of the second base station, and location information for locating a position of a mobile terminal, on the basis of the acquired operation information. With this arrangement, it is possible to enhance the quality of service for mobile terminal users who ride the moving object having a shielded space, as in the first to third embodiments.

Figure 16:
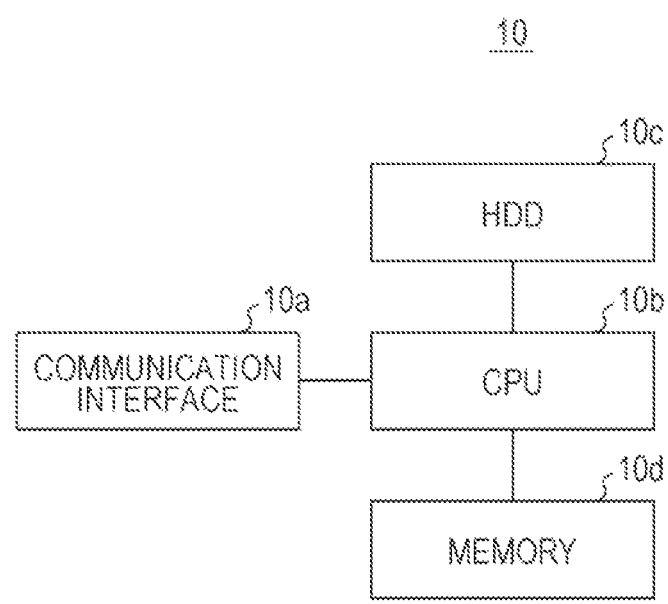
FIG. 16 is a block diagram illustrating an example of the hardware configuration of the communication control apparatus.

[2] Each of the communication control apparatuses 10-1 to 10-3 according to the first to third embodiments may be realized by a hardware configuration described below. FIG. 16 is a block diagram illustrating an example of the hardware configuration of the communication control apparatus. Each of the communication control apparatuses 10-1 to 10-3 is realized by a communication control apparatus 10 having a hardware configuration illustrated in FIG. 16. More specifically, as illustrated in FIG. 16, the communication control apparatus 10 has a communication interface 10$a$, a central processing unit (CPU) 10$b$, a hard disk drive (HDD) 10$c$, and a memory 10$d$ as hardware elements. The memory 10$d$ is realized by, for example, a flash memory, a read only memory (ROM), or a random access memory (RAM), such as a synchronous dynamic random access memory (SDRAM). The operation-information acquirer 11 is realized by the communication interface 10$a$. The channel controller 13, the transmission-power controller 14, and the location-information controller 16 are realized by the CPU 10$b$. The operation-information manager 12, the transmission-power-information manager 15, and the location-information manager 17 are realized by the CPU 10b and the HDD 10c.

[3] The various types of processing described above may be realized by causing the CPU 10b to execute prepared programs. That is, programs corresponding to the processing executed by the operation-information acquirer 11, the channel controller 13, the transmission-power controller 14, the location-information controller 16, the operation-information manager 12, the transmission-power-information manager 15, and/or the location-information manager 17 may be pre-stored in the HDD 10c or the memory 10d and read out to the CPU 10b to function as processes. The programs may or may not be pre-stored in the HDD 10c or the memory 10d. For example, the programs may be pre-recorded to a portable recording medium connectable to the communication control apparatus 10 and read out to the CPU 10b to function as processes. Examples of the portable recording medium include a flexible disk (FD), a compact disk-read only memory (CD-ROM), a magneto-optical (MO) disk, a digital versatile disk (DVD), an integrated circuit (IC) card, and a memory card. For example, the programs may be pre-stored on a computer, server, or the like connected to the communication control apparatus 10 through the Internet, a local area network (LAN), or a WAN (wide area network) in a wired or wireless manner and read out to the CPU 10b to function as processes.

[4] The first embodiment and the second embodiment may also be combined together. The second embodiment and the third embodiment may also be combined together. The first embodiment and the third embodiment may also be combined together. All of the first to third embodiments may also be combined together.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control apparatus comprising:
   an acquirer that acquires operation information of a moving object having a shielded space therein; and
   a controller that controls, based on the operation information, a channel between a first base station installed in a car in the moving object and a second base station installed on each floor where the car is stoppable, transmission power of the first base station and transmission power of the second base station, and location information for locating a position of a mobile terminal for each floor where the car is stoppable;
   wherein the controller controls the transmission power of the first base station and the transmission power of the second base station on the basis of a current position and an open or closed state of a door on the car.

2. The communication control apparatus according to claim 1,
   wherein the moving object is an elevator.

3. The communication control apparatus according to claim 2,
   wherein the operation information includes a destination floor representing the floor where the car is scheduled to stop; and
   before the car stops at the destination floor, the controller establishes the channel between the first base station and the second base station installed on the destination floor, on the basis of the destination floor.

4. The communication control apparatus according to claim 3,
   wherein the operation information further includes the current position of the car; and
   when the car starts moving, the controller releases the channel between the first base station and the second base station installed on the floor where the car starts moving, on the basis of the current position.

5. The communication control apparatus according to claim 2,
   wherein the operation information further includes the current position of the car and the open or closed state of the door of the car.

6. The communication control apparatus according to claim 2,
   wherein the controller performs control so that a transmission-power value of the first base station when the door is open is smaller than a transmission-power value of the first base station when the door is closed.

7. The communication control apparatus according to claim 6,
   wherein the controller performs control so that a transmission-power value of the second base station installed on the floor where the car is present is smaller than a transmission-power value of the second base station installed on the floor where the car is not present.

8. The communication control apparatus according to claim 6,
   wherein the controller performs control so that a transmission-power value of the second base station when the door is open is smaller than a transmission-power value of the second base station when the door is closed.

9. The communication control apparatus according to claim 6,
   wherein the location information indicates a first reception-power value of signals at the mobile terminal, the signals being transmitted from the first base station, and a second reception-power value of signals at the mobile terminal, the signals being transmitted from the second base station;
   the communication control apparatus further comprises a manager that manages the location information for each floor where the car is stoppable;
   the operation information further includes the current position of the car and the open or closed state of the door of the car; and
   the controller updates the first reception-power value and the second reception-power value on the basis of the current position and the open or closed state.

10. The communication control apparatus according to claim 2,
    wherein the controller updates, in the location information, the first reception-power value in an area corresponding to an installation position of the elevator at the floor where the car is stoppable so that the first reception-power value when the car is present at the floor is smaller than the first reception-power value when the car is not present at the floor.

11. The communication control apparatus according to claim 10, wherein the controller updates, in the location information, the second reception-power value in an area corresponding to a position adjacent to an installation position of the elevator at the floor where the elevator is stoppable so that the second reception-power value when the car is present at the floor is smaller than the second reception-power value when the car is not present at the floor.

12. The communication control apparatus according to claim 10,
wherein the controller updates, in the location information, the first reception-power value in an area corresponding to a position adjacent to an installation position of the elevator at the floor where the car is stoppable so that the first reception-power value when the door is open is smaller than the first reception-power value when the door is closed.

13. A communication control apparatus according to claim 10,
wherein the first base station is installed in the shielded space and the second base station is installed at a position where the elevator stops.

14. A communication control method comprising:
acquiring operation information of an elevator; and
controlling, based on the operation information, a channel between a first base station installed in a car in the elevator and a second base station installed on each floor where the car is stoppable, transmission power of the first base station and transmission power of the second base station, and location information for locating a position of a mobile terminal for each floor where the car is stoppable;
wherein the controlling the transmission power of the first base station and transmission power of the second base station on the basis of a current position and an open or closed state of a door of the car.

15. A communication control apparatus comprising:
a processor connected to a memory;
wherein the processor performs processing for acquiring operation information of an elevator and for controlling, based on the operation information, a channel between a first base station installed in a car in the elevator and a second base station installed on each floor where the car is stoppable, transmission power of the first base station and transmission power of the second base station, and location information for locating a position of a mobile terminal for each floor where the car is stoppable;
wherein the controlling the transmission power of the first base station and transmission power of the second base station on the basis of a current position and an open or closed state of a door of the car.

* * * * *